United States Patent [19]

Anten

[11] Patent Number: 5,140,632
[45] Date of Patent: Aug. 18, 1992

[54] TELEPHONE HAVING VOICE CAPABILITY ADAPTOR

[76] Inventor: Lewis Anten, 17423 Rancho St., Encino, Calif. 91436

[21] Appl. No.: 548,256

[22] Filed: Jul. 5, 1990

[51] Int. Cl.[5] .................... H04M 1/00; H03K 17/94
[52] U.S. Cl. .................... 379/447; 379/368; 379/369; 379/370; 379/58; 341/22; 341/27
[58] Field of Search ............ 379/447, 450, 368, 369, 379/355, 370, 58; 340/711; 341/21, 22, 23, 27; 455/89, 90, 344, 347

[56] References Cited

U.S. PATENT DOCUMENTS

| | | | |
|---|---|---|---|
| 3,626,409 | 12/1971 | Hill | 379/368 |
| 3,696,408 | 10/1972 | Bouchard et al. | 379/368 |
| 3,739,105 | 6/1973 | Anson | 379/447 |
| 3,778,553 | 12/1973 | Rackman | 379/450 |
| 4,002,855 | 1/1977 | Schiffman et al. | 379/450 |
| 4,325,142 | 4/1982 | Nakazawa | 455/89 |
| 4,491,692 | 1/1985 | Lee | 341/22 |

FOREIGN PATENT DOCUMENTS

| | | | |
|---|---|---|---|
| 3616368 | 11/1987 | Fed. Rep. of Germany | 379/58 |
| 0111362 | 9/1981 | Japan | 379/58 |
| 0276353 | 11/1988 | Japan | 379/355 |
| 0095645 | 4/1989 | Japan | 379/368 |

*Primary Examiner*—James L. Dwyer
*Assistant Examiner*—Jason Chan
*Attorney, Agent, or Firm*—Lewis Anten

[57] ABSTRACT

An adaptor unit is designed to fit over the touch tone telephone pad of a cellular car phone. The adaptor unit has an electronic voice quality chip module in it so that when push buttons having numbers on them on the adaptor unit corresponding to the numbers on the touch tone pad are pressed, the voice module says the number. The adaptor unit has a built in speaker and battery supply so that it can be snapped over and attached to an existing telephone touch tone pad and does not require any wiring.

9 Claims, 3 Drawing Sheets

FIG. 2
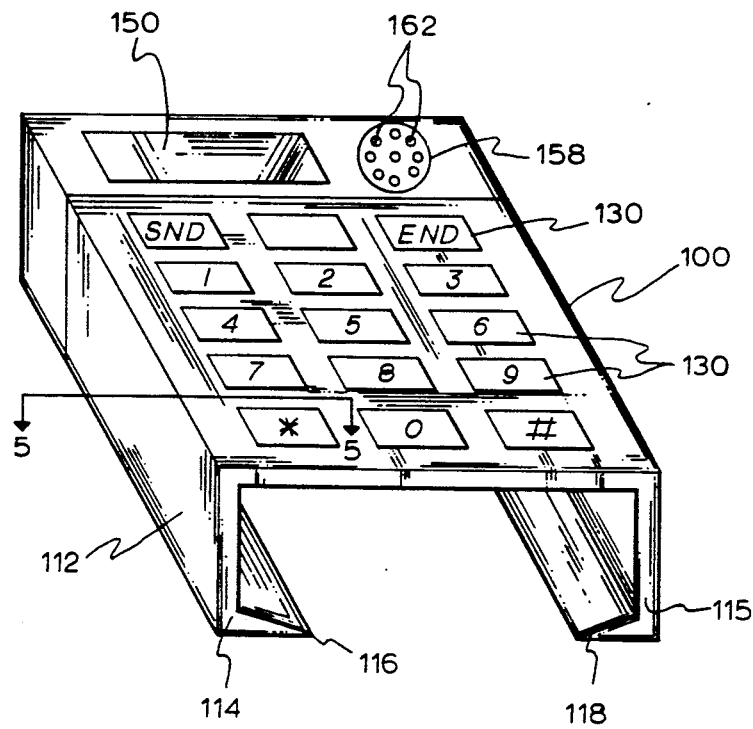
FIG. 3
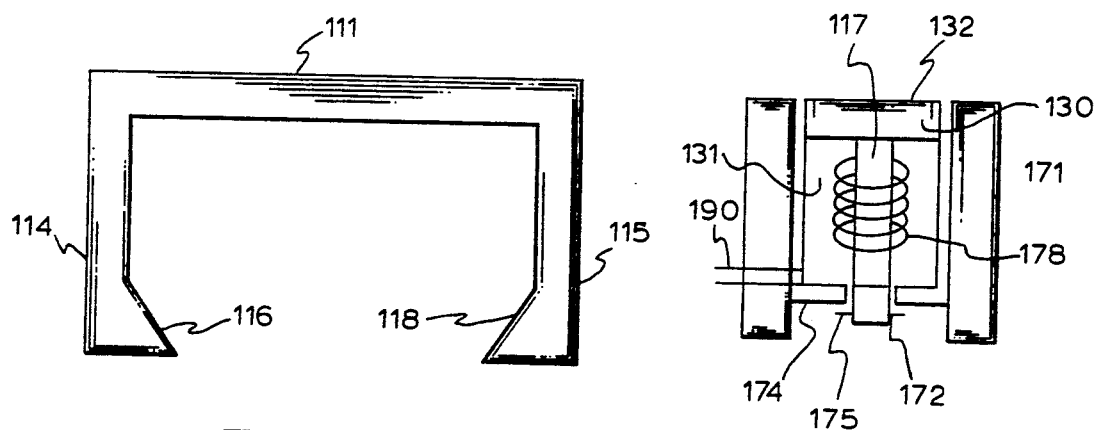
FIG. 5

TELEPHONE HAVING VOICE CAPABILITY ADAPTOR

BACKGROUND

Cellular car phones have become very popular in recent years, particularly in large urban areas where great amounts of time are spent in cars commuting. The typical car phone consists of a handset piece that is supported in a cradle between the front seats or near the legs of the driver. The car phone may be operated in two different ways. The number can be dialed while the phone is in the cradle and then picked up and the conversation held or the handset unit can be picked up and the number dialed outside of the cradle.

In either instance the eyes of the driver must be removed from the road, at least temporarily. Since it is common to dial up to ten digits, the area code and telephone number, before contacting the Send button, it is quite common to mis-dial telephone numbers. This is particularly the case when the phone is dialed while in the cradle. Since it currently costs about $0.50 to transmit each telephone number, even if it is a wrong number that is dialed, it is quite annoying and costly to dial the wrong number. Accordingly, more time than would usually be expected is spent dialing a number.

While some cellular car phones do provide a memory recall feature, this is useful only for dialing numbers that had already been preprogrammed and has no use on most calls. Even in those situations, it is still necessary to dial the particular code for the stored number, again requiring the driver take his eyes off of the road.

In either event, it is common for the driver to want to view the display of the number dialed before pushing the Send button. Since the display is relatively small and is not easy to see in the first place, it takes a relatively long time to view the number shown on the display. It is not uncommon to have to look back and forth from the road to the telephone a number of times before it can be determined that the right number has been dialed by the user.

While there have been voice chips that have been integrated into home appliances, no adapters to a touch phone pad or cellular car phones with built in voice chips have been made. Further, there has been no simple way of converting existing phones, including existing cellular car phones in use today, so as to have such voice capability. Further, some phone systems do not use different tones making verification of the number dialed by a blind person impossible. The use of voice capability for indicating the numbers and functions pushed on a cellular car phone is one area in particular where concern for safety needed to be addressed. Apparently, the failure of the market place to find a need for voice capability on home appliances has discouraged the use of voice chips in other equipment.

There are currently on the market many devices that incorporate voice chips that are activated by the pressing of buttons. Once such device is a talking toy book, which makes a sound or repeats a word when a button is pushed.

SUMMARY OF THE INVENTION

The present invention consists of an adaptor unit that is designed to fit over and attach to the handset of a cellular car phone, or other telephone, over the portion of the handset that has the number and function pad. The adaptor unit includes a housing having a series of buttons corresponding to the buttons of the number and function pad of the car phone handset. These would include the numerals 0-9 as well as the star and number sign, as well as the other functions, such as Send, End etc. The adaptor unit has a self contained battery supply and a speaker so that it does not require any modification of the existing cellular car phone itself. The depressible buttons on the adaptor are aligned with the buttons of the car phone touch pad so that depression of the button on the adaptor unit causes the corresponding button on the handset to be pressed as well.

The voice chip module contained in the adaptor unit would be powered upon the activation of the adaptor buttons so that it is constantly on, but only drains current from the battery supply when the buttons are depressed. The chip is a voice quality sound chip and upon depression of the adaptor unit button the sound from the chip corresponding to the number or function on the adaptor unit that was depressed, the speaker would audibly announce the number or function of the button depressed.

Thus, the user of the cellular phone would be able to hear the number or function that was depressed and know whether it is right or wrong, without having to view the display on the cellular car phone.

While the adaptor is particularly useful for car phones, it is recognized that it can also be used with existing telephones in the home, and would have particular application for use in the night or by viewing impaired people. In addition, the cellular car phone can have the voice chip module incorporated into the car phone itself as original equipment.

OBJECTS OF THE INVENTION

It is an object of the present invention to provide an adaptor to a push button phone pad that is simple to operate.

It is an object of the present invention to provide an adaptor to a push button phone pad that is reliable;

It is another object of the present invention to provide an adaptor to a push button phone pad that is simple to attach to an existing car phone;

It is still another object of the present invention to provide an adaptor to a push button phone pad that is safer to use;

It is yet another object of the present invention to provide an adaptor to a push button phone pad that does not require any rewiring of an existing car phone.

It is another object of the present invention to provide a safer cellular car phone having voice capability.

These and other objects of the present invention will be apparent from a review of the following specification and accompanying drawings.

BRIEF DESCRIPTION OF THE FIGURES

FIG. 2 is a perspective view of adaptor unit of FIG. 1.

FIG. 3 is an end view of adapter unit of FIG. 2.

FIG. 5 is an expanded sectional view of the push button control of adaptor unit of FIG. 2 taken along lines 5—5.

DETAILED DESCRIPTION OF THE DRAWINGS

Figure 1:
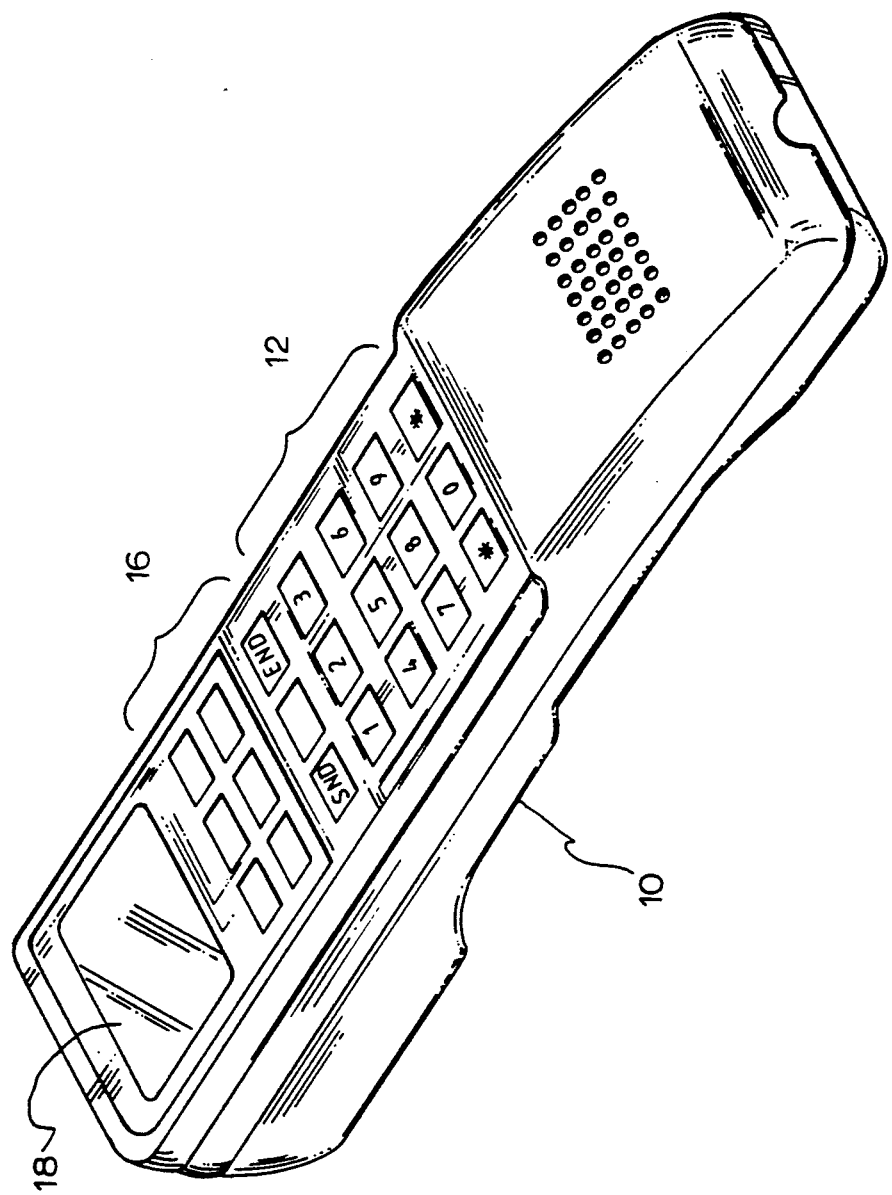
FIG. 1 is a top perspective view of a standard cellular car phone.

Referring to FIG. 1 a typical cellular car phone handset 10 is shown. The handset 10 consists of a lower portion consisting of a number pad 12 listing the numerals of the conventional telephone pad numerals 0–9 and the star (*) and number (#) signs, that are used for special functions. The upper portion of the handset 10 consists of the special function buttons 16, a display 18 displays the number dialed, time elapsed and other functions, which typically include Send, End, Function, Recall and the like.

The handset 10 is typically installed in a cradle, not shown, mounted between the seats of the car or over the drive shaft hump with the number 12 and function buttons 16 on the handset 10 facing the driver.

Referring to FIG. 2 the adaptor unit 100 of the present invention intended for use with the cellular handset 10 is shown. The adaptor unit 100 consists of a plastic rectangular housing 112 having a top surface 111, depending arms 114 and 115, from the sides of the top surface 111. The depending arms 114 and 115 have inwardly projecting tips 116 and 118 designed to snap fit around the bottom or sides of the handset 10 of the car phone, firmly attaching the adaptor unit 100 to the handset 10. The depending arms 114 and 115 are flexible so that they expand outwardly when pressed around the body of the car phone handset 10. An end view of the adaptor unit 10 is shown in FIG. 3.

It is recognized that there are a number of different sized handsets and that the size of the adaptor unit 100 must be made to accommodate the size of the handset 10. Further, it is possible to have different sized adapters for different models of car phones. It would also be possible to have the side arms 114 and 115 of the adaptor unit 100 be adjustable so that they could be extended so as to fit over a number of different sized handsets 10. It would also be possible to make the adaptor unit 100 attached directly to the top surface of the handset 10 by means such as adhesive.

The adaptor unit 100 has a series of push buttons 130 on the upper surface 111 of the adaptor unit 100 corresponding to the push buttons 12 and 16 on the handset 10, and are oriented on the adaptor unit 100 so that the push buttons 130 on the adaptor unit 100 is positioned directly over the corresponding push buttons 12 and 16 on the car phone handset 10. While FIG. 2 shows only the number pad, it is possible to extend the adaptor unit so as to have all of the function buttons as well.

Figure 4:
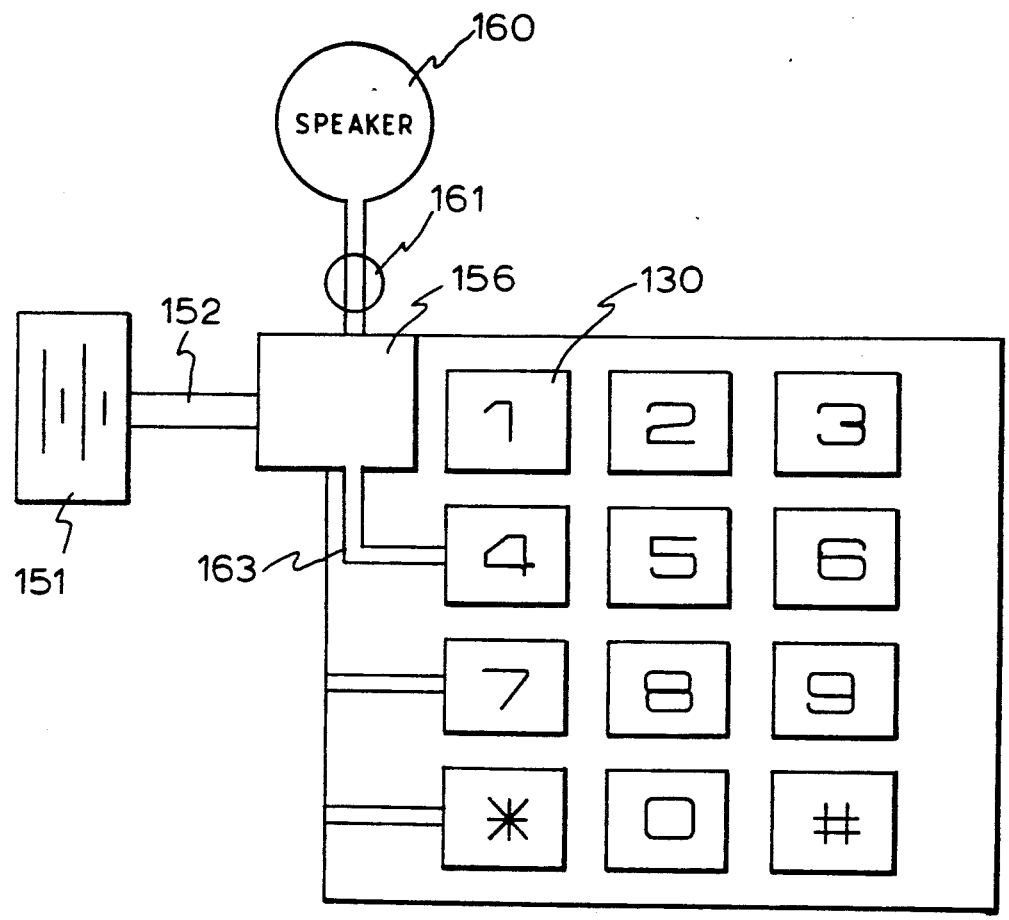
FIG. 4 is a circuit diagram of the electronic circuit of the present invention.

The adaptor unit 100 has a battery compartment 150 containing a battery 151 with appropriate contacts and wires 152, shown in FIG. 4, connecting the battery 151 to a voice chip circuit 156, and a speaker compartment 158 for holding a conventional small speaker 160. There are openings 162 above the speaker compartment 158 for permitting the sound made by the speaker 160 to be easily heard by the user.

A push button 130 of the adapter unit 100 are shown in cross section in FIG. 5. The push buttons 130 are recessed in an opening 131 having an upper surface 132 which has the indicia for the appropriate numeral or function embossed or otherwise attached to the top surface 132 to identify the number or function of that push button 130, and a projecting rod 170 extending from the bottom 171 of the push button 130 through an opening 172 in a disc plate 174 in the bottom of the opening 131. A C-ring 171 holds the rod 170 in place. Spring 178 is trapped between the disc plate 174 and the bottom 171 of the push button causing the push button 130 to be in its normally raised position. Depression of the push button 130 will cause the projecting rod 170 to extend below the bottom of the adapter unit 100 and contact any button 130 and 116 below it on the car phone handset 10. Since the spring 178 is then in its compressed stage, removal of the pressure on the push button 130 will permit the spring 178 to return to its initial extended position and return the push button 130 and the rod 170 to its original position as well.

Depression of the push button 130 causes contacts 190 located below the bottom surface 171 of the push button 130 to close the circuit. This can be accomplished by any number of conventional means, such as a sliding or pressure contact. The circuit contained in each of the push buttons results in the sound chip 156 to activate the appropriate sound, such as the numeral corresponding to the number on the push button 130.

Referring to FIG. 4, the circuit of the present invention is shown. A sound chip 156 is connected to a battery supply 151 and to a speaker 160. There is a volume control 161 for controlling the loudness of the speaker 160. The sound chip 156 has its appropriate leads 163 for activating each portion of the sound chip 156 to a series of push button contacts corresponding to the numbers and functions. Thus depression of the button having the numeral "1" on it will cause the sound chip to say "ONE". In this way, depression of any of the appropriate push buttons 130 will cause any of the sounds desired to be created in associated with the adaptor unit to be heard.

The depression of the appropriate push button 130 on the adaptor unit 100 does not interfere with the operation of the handset 10 itself. The depression of the push button 130 causes the activation of the buttons 12 and 16 on the handset 10 and the handset 10 will also cause the creation of an audible beep tone indicating that the buttons 12 and 16 have been pushed on the handset 10. With the present invention, the user will not only hear the number or function that has been pushed, but also the beep tone confirming that the push buttons 12 and 16 on the handset 10 have been pushed and that it is the correct number. It is also possible to incorporate a memory function with the sound chip so that the entire number dialed can be repeated at one time when an appropriate button, or combination of buttons are depressed.

Since the battery 151 is only powering the circuit when the adaptor unit 100 is in use, there is no drain on the battery 151 and it should last a acceptably long time, particularly since car phone are not dialed very much compared even to the amount of time that they are actually used.

It is possible to incorporate a light into the adaptor unit 100 so that at night time the numbers that are being dialed can be observed. This can be achieved by incorporating a light into the space between the space plate and the bottom surface or by making the adaptor rod 170 and push button 130 is of a light transmitting plastic so that the light from the original push buttons of the handset 10 will illuminate them, or by attachment of a light to the outside of the adaptor unit 100 In the event that the outside light is used, in order to avoid drain on the battery 151, the light could be turned on and off by an on-off switch. The on/off switch could also turn the audible sound of the voice chip 156 off and on as well. Since the coupling between the adaptor unit 100 and the handset 10 is mechanical, the lack of power or incorporation of the adaptor unit 100 does not interfere with the operation of the car phone.

While the invention is described with reference to the preferred embodiment it is recognized that it can be modified so as to have other applications, such with a conventional telephone. In such an instance the speaker and the batter unit could be separate units from the adaptor unit and the adaptor could be adhesively applied, by double sticky tape to the top of the phone pad or merely resting on the touch tone phone pad. The speaker and a battery pack could be in a separate compartment.

While the present invention has been described with regards to the preferred embodiments, it must be recognized that it is possible to make other variations of the present invention without departing from the scope of the present invention. Also, while the present invention has been described extensively in association with its use for car telephones, it is possible to use the adaptor unit on other apparatus and equipment that may require adaptation to voice indication of the activation of the equipment.

What is claimed is:

1. An adaptor for operating a device having push buttons comprising a housing, said housing having a plurality of push buttons positioned so as to correspond in position to the push buttons on the device desired to be operated, means associated with said push buttons on said adaptor whereby pushing one of said push buttons on said adaptor permits depression of the corresponding one of said push buttons on said device desired to be operated, a sound chip, a power means for providing power to said sound chip, a speaker and whereby depression of said one of said push buttons on said adaptor causes said sound chip to audibly create a sound corresponding to the desired sound associated with said corresponding one of buttons said push on the device desired to be operated.

2. The adaptor of claim 1 whereby depressing said one of said push buttons on said adaptor results in the mechanical coupling of said one of said push buttons on said adaptor to the corresponding of said buttons on the device desired to be operated.

3. The adaptor of claim 1 in which said push buttons on said device correspond to the functions on the bush buttons on a cellular car phone.

4. The adaptor of claim 3 wherein said cellular car phone has a handset wherein said adaptor has attachment means for attachment to the handset of the cellular car phone.

5. The adaptor of claim 4 in which the housing includes depending side arms for attachment to the handset of the cellular car phone.

6. The adaptor of claim 4 in which each of said push buttons on said adaptor has a rod depending from a bottom surface on the push buttons on said adaptor for depressing the corresponding push button the on the cellular car phone.

7. The adaptor of claim 6 in which each of said push buttons on said adaptor upwards in its normal position by a spring means.

8. The adaptor of claim 1 in which said sound chip is a voice sound chip for generating sounds corresponding to all of the numbers and functions of the push buttons of a telephone.

9. The adaptor of claim 1 in which depression of said one of said push buttons on said adaptor closes a contact causing said sound chip to indicate the corresponding function of the corresponding on of said push button on the device desired to be operated.

* * * * *